United States Patent
Wenneis et al.

(10) Patent No.: US 7,407,728 B2
(45) Date of Patent: Aug. 5, 2008

(54) ALKALINE CELL OR BATTERY

(75) Inventors: Wolffried Wenneis, Mannheim (DE); Harald Hoffmann, Dossenheim (DE); Birgit Severich, Viernheim (DE); Hartwig Höcker, Aachen (DE); Helmut Keul, Aachen (DE)

(73) Assignee: Carl Freudenberg KG, Weinheim (DE)

( * ) Notice: Subject to any disclaimer, the term of this patent is extended or adjusted under 35 U.S.C. 154(b) by 95 days.

(21) Appl. No.: 10/236,434

(22) Filed: Sep. 6, 2002

(65) Prior Publication Data

US 2003/0049539 A1 Mar. 13, 2003

(30) Foreign Application Priority Data

Sep. 7, 2001 (DE) ................ 101 43 898

(51) Int. Cl.
*H01M 2/16* (2006.01)
(52) U.S. Cl. .................. 429/254; 429/206; 429/145; 429/249
(58) Field of Classification Search .................. 429/249, 429/253, 254, 145
See application file for complete search history.

(56) References Cited

U.S. PATENT DOCUMENTS

| 5,362,581 | A | * | 11/1994 | Chang et al. ................. 429/249 |
| 6,042,970 | A |   | 3/2000 | Senyarich et al. |
| 6,080,471 | A | * | 6/2000 | Shigematsu et al. .... 428/311.11 |
| 6,348,286 | B1 | * | 2/2002 | Tanaka et al. ................ 429/247 |
| 6,403,265 | B1 | * | 6/2002 | Tanaka et al. ................ 429/249 |
| 2003/0032360 | A1 | * | 2/2003 | Kritzer ........................ 442/414 |

FOREIGN PATENT DOCUMENTS

| DE | 1 142 942 | 1/1963 |
|----|-----------|--------|
| DE | 2 203 167 | 10/1972 |
| DE | 2 164 901 | 7/1973 |
| DE | 2 243 531 | 9/1973 |
| DE | 31 16 738 | 11/1982 |
| DE | 38 87 460 | 5/1994 |
| DE | 195 23 231 | 8/1996 |
| DE | 198 35 615 | 2/2000 |
| DE | 198 50 826 | 5/2000 |
| DE | 199 16 109 | 10/2000 |
| EP | 0 316 916 | 5/1989 |
| EP | 0 593 612 | 4/1994 |
| EP | 0 625 805 | 11/1994 |
| EP | 0 680 104 | 8/1997 |
| EP | 1 047 140 | 10/2000 |
| EP | 1 073 131 | 1/2001 |
| JP | 2-276154 | 11/1990 |
| JP | 6-119056 | 4/1994 |
| JP | 7-138391 | 5/1995 |
| JP | 10-069920 | 3/1998 |
| JP | 10-116600 | 5/1998 |
| JP | 2000-123814 | 4/2000 |
| JP | 2000-294217 | 10/2000 |
| JP | 2000-294218 | 10/2000 |
| JP | 2001-210298 | 8/2001 |
| JP | 2002063890 | A * 2/2002 |
| JP | 2002-298819 | 10/2002 |

\* cited by examiner

*Primary Examiner*—John S Maples
(74) *Attorney, Agent, or Firm*—Kenyon & Kenyon LLP

(57) ABSTRACT

An alkaline cell or battery having at least one positive and one negative electrode which are separated by a separator and which are disposed, along with an alkaline electrolyte, in a housing, the separator being a non-woven fabric, a microporous foil, or a web made of one or a plurality of polymers, which are formed by copolymerization or grafting through reactive extrusion, and which have functional groups in the molecule or form them in the alkaline electrolyte, the functional groups being active as Lewis acids.

12 Claims, No Drawings

ALKALINE CELL OR BATTERY

BACKGROUND OF THE INVENTION

1. Field of the Invention

The invention relates to an alkaline cell or battery, having at least one positive and one negative electrode, which are separated by a separator, and which are disposed, together with an alkaline electrolyte, in a housing.

2. Description of Related Art

Alkaline batteries or cells must have a separator material, which generally has the following properties:

1. Resistance to the electrolyte,
2. Resistance to oxidation,
3. High mechanical stability,
4. Small thickness tolerances,
5. Low ion volume resistance,
6. High electron volume resistance,
7. A capacity to retain solid particles released by the electrodes,
8. Permanent wettability by the electrolyte, and
9. A high reservoir capacity for the electrolyte fluid.

Depending on the polymer used for manufacturing the separator, the various separator materials have various advantages and disadvantages. Thus, by way of example, separators made of polyolefins are very resistant to the chemical action of powerfully alkaline electrolytes and to oxidation in the chemical environment of the cells, but the wettability by the alkaline electrolyte is still poor. On the other hand, polyamide always has sufficient wettability, but its resistance to hydrolysis is not satisfactory, especially at higher temperatures.

In German Patent A 2 164 901, German Patent A 1142942, German Patent A 2 203 167, and German Patent A 2 243 531, separators are described that are made of polyamide and/or polyolefins. To improve the wettability of polyolefin fibers, various methods have been proposed. Thus, German Patent A 31 16 738 and European Patent A 0 625 805 disclose a plasma treatment of polyolefins, and Japanese Patent A 61/19056, Japanese Patent A 2/276154 as well as German Patent A 19523231 disclose a fluorination method for polyolefins. European Patent A 593 612 describes a method for modifying the surface of polyolefins through a wet-chemical grafting of a vinyl monomer. To modify the surface of separators made of polyolefins, it is also known from European Patent A 316916 to sulfonate the polyolefins in oleum.

When they are used in nickel/metal hydride or nickel/cadmium storage batteries, separators are given a further task. Storage batteries of this type have the disadvantage of accelerated self-discharging. The electrons in the interior of the cells are slowly transported from the negative cadmium or metal hydride electrode to the positive nickel oxide electrode, and then are no longer available for external consumers. The cell by itself discharges slowly even when at rest. In this context, in the event of an extreme depth-discharge, electrodes can sometimes become unusable, which results in the total loss of the storage battery.

As a mechanism for this undesirable self-discharge, hydrogen compounds have been discussed which are responsible for transporting the electrons by reduction at the negative electrode and by oxidation at the positive electrode. The corresponding reactions are represented below in the example of the reaction equation for a nickel/metal hydride storage battery;

Negative Electrode

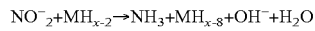

Positive Electrode

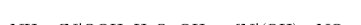

SUMMARY OF THE INVENTION

It is the object of the invention to provide alkaline cells or batteries, in which the separator material that is used either reduces or eliminates the self-discharging.

These and other objects of the invention are achieved by an alkaline cell or battery having at least one positive and one negative electrode, which are separated by a separator and which are disposed, along with an alkaline electrolyte, in a housing, wherein the separator is a non-woven fabric, a microporous foil, or a web made of one or a plurality of polymers, which are formed by copolymerization or grafting through reactive extrusion, and which have functional groups in the molecule or form them in the alkaline electrolyte, the functional groups being active as Lewis acids.

DETAILED DESCRIPTION OF THE INVENTION

The invention provides an alkaline cell or battery in which the separator is a non-woven fabric, a micro-porous foil, or a web made of one or plurality of polymers which are functionalized in the mass by copolymerization or by grafting through reactive extrusion, and which have functional groups in the molecule or which form them in the alkaline electrolyte, the functional groups being active as Lewis acids. In contrast to the materials known from the related art, the polymers used in accordance with the present invention are not functionalized through wet-chemical surface modification.

As used herein, the term "functionalized in the mass" refers to the way in which the polymer is formed, and specifically refers to the process of copolymerization or grafting through reactive extrusion.

Especially preferred is a separator that binds at least 0.1 mmol $NH_3$/g separator mass, but preferably 0.2 mmol $NH_3$/g, and especially preferred at least 0.4 mmol $NH_3$/g separator mass.

According to the present invention, a separator is used that is functionalized in the mass by copolymerization or by grafting through reactive extrusion of a polyolefin, polystyrene, polyphenylene sulfide, polysulfone, or mixtures thereof.

It is furthermore especially preferred that the polymers making up the separator have a carbon/oxygen ratio (C/O ratio) <10, preferably <8, and especially preferred <5, after being held in a 30% potassium hydroxide solution over a time period of 3 days at a temperature of 40° C.

For determining the ammonium binding capacity, the following method is used: Roughly 2 g of the starting polymer that is provided as separator material are held for 3 days at 40° C. in 120 ml of 8 molar potassium hydroxide solution (KOH), 5 ml of 0.3 molar ammonia ($NH_3$) being added. Two blank tests [negative controls] are initiated simultaneously without starting polymers. After the holding period, any oily deposits are taken up from the surface using filter paper and removed. Of the originally 125 ml of the starting quantity, a partial quantity of 100 ml is removed, and the ammonia is distilled therefrom using a water vapor distillation in 150 ml distilled water, to which is added 10 ml of 0.1 molar hydrochloric acid (HCl) and a few drops of methyl red as an indicator. The acid is subsequently back-titrated using a 0.1 normal sodium hydroxide solution (NaOH).

The present invention is explained in greater detail with reference to the following examples, which should be regarded in an illustrative sense.

EXAMPLE 1

From a statistical copolymer made of polyethylene and an aliphatic polyketone having an XPS C/O ratio of 9.24, staple fibers were produced from the melted mass through extrusion. On a carding machine, a bonded fiber fabric having a weight of 80 g/m$^2$ was produced from these fibers, which had a titer of 2 dtex and a staple length of 38 mm. This non-woven fabric was then thermally sealed in a dot-like configuration, the individual square sealing points having an edge length of 0.48 mm, and one square centimeter of the non-woven fabric surface containing 48 sealing points. The sealed surfaces, in comparison to the overall surface of the non-woven fabric separator, had a proportion of 11%. The thickness of the separator material produced was measured at 0.41 mm. The ammonium binding capacity was 0.32 mmol NH$_3$ per g separator.

EXAMPLE 2

From a statistical copolymer made of polyethylene and an aliphatic polyketone having an XPS C/O ratio of 9.24, staple fibers were produced from the melted mass through extrusion. On a carding machine, a bonded fiber fabric having a weight of 70 g/m$^2$ was produced from these fibers, which had a titer of 1.3 dtex and a staple length of 38 mm. This fabric was strengthened through water-jet stitching. After drying, a thickness of 0.35 mm was measured in the non-woven fabric separator material that was produced in this context. Subsequently, the material was calendered between steel rollers at a temperature of 100° C. to a thickness of 0.22 mm. The ammonium binding capacity was 0.32 mmol NH$_3$ per g separator.

EXAMPLE 3

From a grafted copolymer made of maleic acid anhydride and polypropylene, which was produced through reactive extrusion, and which had an XPS C/O ratio of 5.21, staple fibers were produced from the melted mass through extrusion. On a carding machine, a bonded fiber fabric having a weight of 55 g/m$^2$ was then produced from a mixture of 50% of these fibers, which had a titer of 1.3 dtex and a staple length of 38 mm, and of 50% of a polyolefin fiber, whose fiber substance was made up of 1/3 polypropylene in the core and 2/3 polyethylene in the shell, and having a titer of 3.3 dtex and a staple length of 64 mm. This fabric was then heated in an oven at a temperature of 145° C., the polyethylene sleeve of the one fiber component melting. The heated fabric was then pressed between two rollers and, in the process, cooled off. In this context, the fibers were bonded to each other at their crossing points. The separator material produced in this process had a thickness of 0.19 mm. The ammonium binding capacity was 0.10 mmol NH$_3$ per g separator.

EXAMPLE 4

From a statistical copolymer made of polyethylene and an aliphatic polyketone having an XPS C/O ratio of 9.24, staple fibers were produced from the melted mass through extrusion. On a hydroformer of a wet non-woven-fabric system, a bonded fiber fabric having a weight of 43 g/m$^2$ was produced from a liquid suspension of a fiber mixture of 70% of these fibers, which had a titer of 1.0 dtex and a staple length of 38 mm, and of 30% of a polyolefin fiber, whose fiber substance was made up of 1/3 polypropylene in the core and 2/3 polyethylene in the shell, and having a titer of 0.8 dtex and a staple length of 5 mm. This fabric was then heated in an oven at a temperature of 145° C., the polyethylene sleeve composed of the one fiber component melting. The heated fabric was then pressed between two rollers and, in the process, cooled off. In this context, the fibers were bonded to each other at their crossing points. The separator material produced in this process had a thickness of 0.14 mm. The ammonium binding capacity was 0.22 mmol NH$_3$ per g separator.

EXAMPLE 5

On a spun-bonded fabric system, in accordance with the familiar melt-blown method, a non-woven fabric having very fine fibers was produced from a grafted copolymer of acrylic acid and polypropylene, which was produced in a reactive extrusion, and which had an XPS C/O ratio of 3.76. The fibers produced in this context had a diameter of 7 μm centrally and an irregular length. The non-woven fabric separator material produced in this process had a weight of 40 g/m$^2$ and a thickness of 0.19 mm. The ammonium binding capacity was 0.54 mmol NH$_3$ per g separator.

COMPARATIVE EXAMPLE

A separator material having a weight of 55 g/m$^2$ was produced from 50% polyolefin fibers, whose fiber substance was made up 1/3 of polypropylene in the core and 2/3 polyethylene in the shell, the process being carried out on a carding machine in a mixture having 50% polypropylene fibers, which had a titer of 2 dtex and a staple length of 38 mm, and which had a titer of 3.3 dtex and a staple length of 64 mm. This non-woven fabric was then heated in an oven at a temperature of 145° C., the polyethylene sleeve composed of the one fiber component melting. The heated non-woven fabric was pressed between two rollers and, in the process, cooled off. In this context, the fibers were bonded to each other at their crossing points. The separator material created in this manner had a thickness of 0.20 mm. The separator material demonstrated in XPS a C/O ratio of 32. The ammonia binding capacity was <0.0089 mmol NH$_3$ per g separator.

What is claimed is:

1. An alkaline cell or battery comprising at least one positive and one negative electrode, which are separated by a separator and which are disposed, along with an alkaline electrolyte, in a housing, wherein the separator is a non-woven fabric or a microporous foil or a web,
    wherein the non-woven fabric or the microporous foil or the web comprises a copolymer which has not been functionalized through wet-chemical surface modification;
    wherein at least one component of the copolymer is selected from the group consisting of polystyrene, polyphenylene sulfide, polysulfone, or mixtures thereof; and
    wherein the separator binds at least 0.1 mmol NH$_3$/g.

2. The alkaline cell or battery according to claim 1, wherein the separator binds at least 0.2 mmol NH$_3$/g.

3. The alkaline cell or battery according to claim 1, wherein the separator binds at least 0.4 mmol NH$_3$/g.

4. The alkaline cell or battery according to claim 1, wherein the copolymer constituting the separator, after being held in a 30% potassium hydroxide solution over a time period of 3 days at a temperature of 40° C., has a carbon/oxygen C/O ratio<10 as determined by x-ray photoelectron spectroscopy (XPS).

5. The alkaline cell or battery according to claim 3, wherein the copolymer constituting the separator, after being held in a 30% potassium hydroxide solution over a time period of 3 days at a temperature of 40° C., has a carbon/oxygen C/O ratio<10 as determined by x-ray photoelectron spectroscopy (XPS).

6. The alkaline cell or battery according to claim 3, wherein the copolymer constituting the separator, after being held in a 30% potassium hydroxide solution over a time period of 3 days at a temperature of 40° C., has a carbon/oxygen C/O ratio<10 as determined by x-ray photoelectron spectroscopy (XPS).

7. The alkaline cell or battery according to claim 4, wherein the copolymer has a C/O ratio<8.

8. The alkaline cell or battery according to claim 4, wherein the copolymer has a C/O ratio<5.

9. The alkaline cell or battery according to claim 5, wherein the copolymer has a C/O ratio<8.

10. The alkaline cell or battery according to claim 6, wherein the copolymer has a C/O ratio<8.

11. The alkaline cell or battery according to claim 5, wherein the copolymer has a C/O ratio<5.

12. The alkaline cell or battery according to claim 6, wherein the copolymer has a C/O ratio<5.

* * * * *